INVENTORS
RICHARD R. RUSSELL
FRANK L. BRIDGES
ATTORNEY

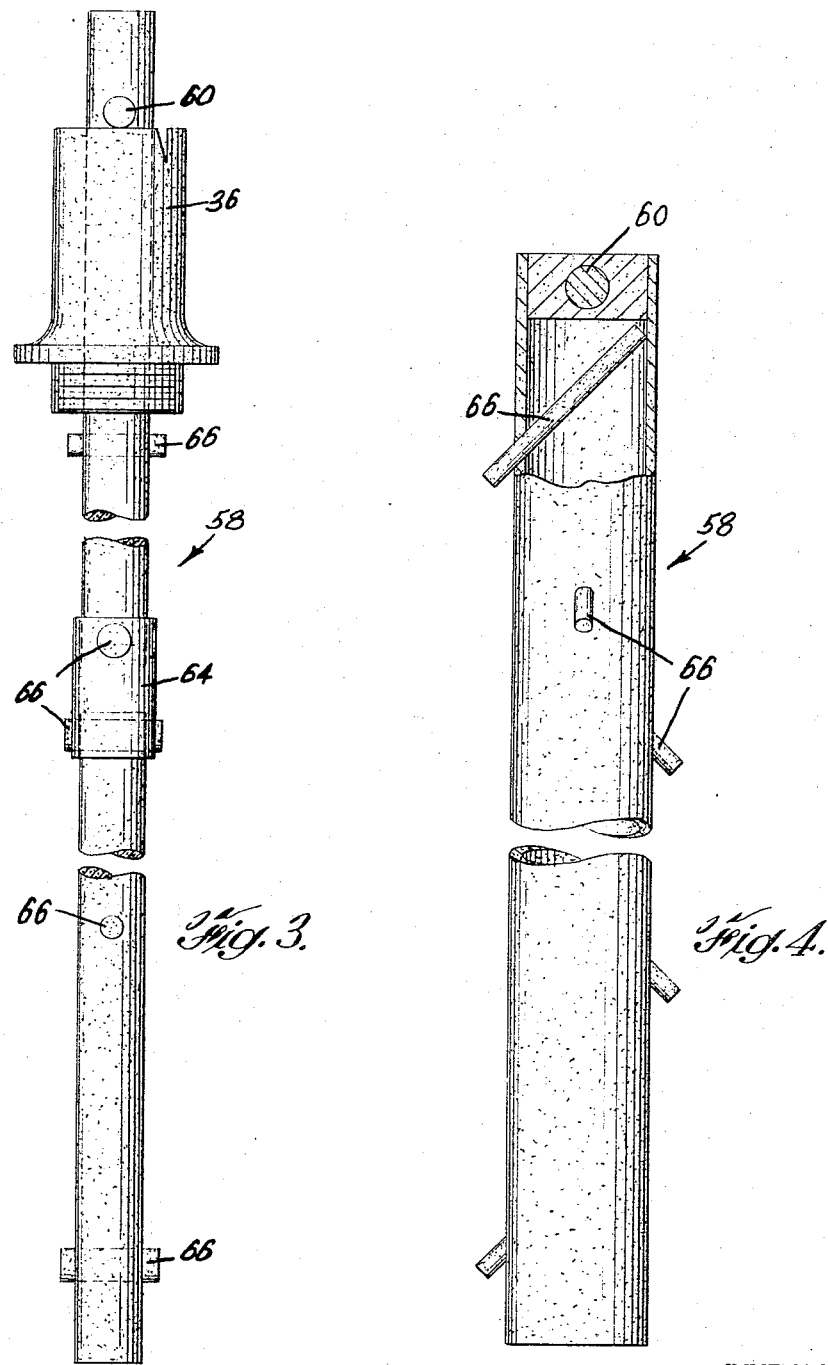

United States Patent Office 3,318,588
Patented May 9, 1967

3,318,588
HIGH PERFORMANCE FALLING-FILM COOLER-ABSORBER
Richard R. Russell, Warrensville Heights, and Frank L. Bridges, Olmsted Falls, Ohio, assignors to Union Carbide Corporation, a corporation of New York
Filed Dec. 21, 1964, Ser. No. 419,841
4 Claims. (Cl. 261—153)

This invention relates to a falling-film gas cooler-absorber, and has as its principal object to provide means for improving the performance of such apparatus.

More particularly, another object of the invention is to provide an improved falling-film type absorber embodying the improvement of the invention.

Still another object of the invention is to provide controlled means of increasing the absorption and recovery of a gas by which a predetermined strength and range of concentrations for the recovered product is capable of being produced.

These and other objects and many of the attendant advantages of this invention will readily become apparent and better understood by particular reference to the following detailed description when considered in connection with the accompanying drawing wherein:

FIGURE 3 illustrates in elevation the actual means which improves the performance characteristics of a falling-film type absorber; and FIGURE 4 is a view similar to that of FIGURE 3, but showing a modified form of the invention.

Figures 1, 2:
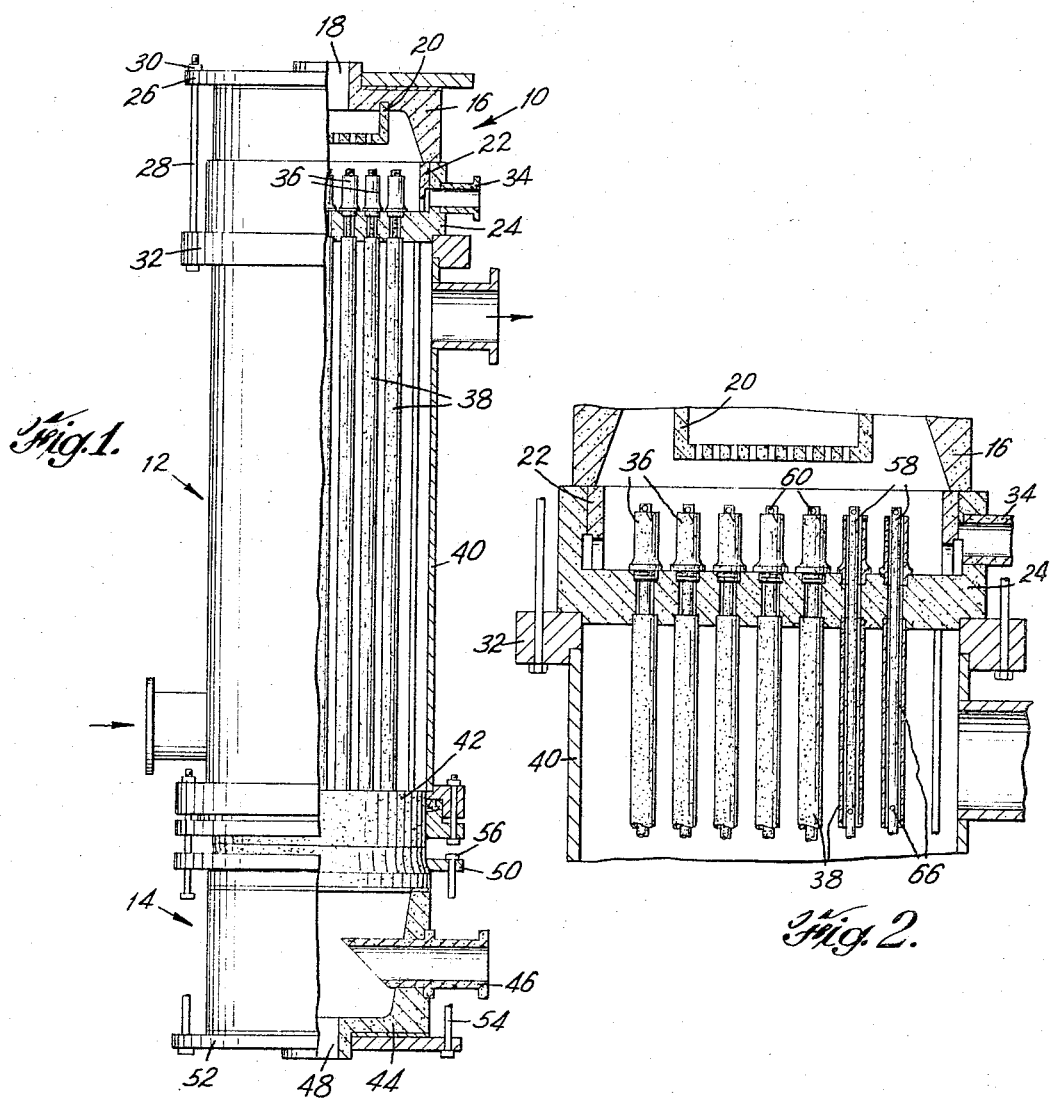
FIGURE 1 is a vertical elevational view, partially in section, of a falling-film type absorber embodying the invention.
FIGURE 2 is an enlarged vertical view, partially in section, of the central portion of FIG. 1 which illustrates the means for improving the performance of this type apparatus.

In accordance with the present invention, a falling-film gas cooler-absorber of the type in which liquid flowing down an inside cooled vertical tube wall in a thin film absorbs a gas generally also flowing downward inside the tube in co-current contact with the liquid film comprises the combination of a falling-film gas cooler-absorber and a plurality of gas velocity increasers. The falling-film gas cooler-absorber may be viewed as consisting of an upper inlet portion, a central heat exchanger-gas recovery portion and a lower outlet portion. The gas velocity increasers which improve the absorption of the gas in the falling-film absorber are suspended from weirs located in the upper inlet portion and are so disposed that they are concentrically arranged within but not secured to the tubes of the heat exchanger tube bundle. The gas velocity increasers are smooth surfaced rods spaced apart from the tubes such that an annulus is formed for the passage of the falling-film and the co-current flowing gas. The gas velocity increasers reduce the cross-sectional area available for gas flow and as will be briefly described hereinafter, therefore, increase the gas mass velocity. The greater the mass velocity, the more absorption, since the absorption is directly proportional to the mass velocity of the gas.

For the sake of conciseness, the invention will now be described in greater detail with particular reference to the absorption of acid gases, such as hydrogen chloride, hydrogen fluoride and the like, although it will be understood that the principles to be disclosed are applicable as well to falling-film chlorinators or falling-film absorbers employed in the absorption of ammonia and sulphur dioxide.

Referring now to the drawing, apparatus embodying the invention comprises a distribution section or upper inlet portion 10, a centralized falling-film type vertical heat exchanger-absorber portion 12 and a lower outlet portion 14 as shown in FIGURE 1. All components of the apparatus in contact with corrosive fluids are composed of a corrosion resistant material, such as, for instance, impervious graphite unless otherwise indicated.

The upper inlet portion 10 comprises generally an inlet housing 16 provided with a gas inlet 18 and a gas baffle 20. The housing 16 which is in the form of a dome-like structure straddles a liquid distribution chamber 22 formed by the fixed tube sheet 24 of the falling-film heat exchanger-absorber 12. A pressure plate 26 secured by the tie-rods 28 and nuts 30 to end flange 32 maintains a leak-proof upper inlet portion 10. The feed water inlet 34 is located in the side of the fixed tube sheet 24. A plurality of adjustable weir tubes 36, as disclosed in U.S. Patent No. 2,859,021, having tangential V-notches are usually threaded to the fixed tube sheet 24 in axial alignment with the tubes 38 of the falling-film heat exchanger-absorber 12. Cooling water, as shown by the reference arrows enters from the lower side of the shell 40 which surrounds the tubes 38 and exits at the upper side of the shell 40.

The lower outlet portion 14 which is disposed beneath the floating tube sheet 42 of the falling-film heat exchanger-absorber 12 comprises an outlet housing 44 having a side vent 46 and an "acid" outlet 48; the outlet housing 44 is suitably secured to the floating tube sheet 42 between an end ring 50 and a pressure plate 52 by means of the tie-rods 54 and nuts 56.

A plurality of gas velocity increasers 58 of the invention, as best shown in FIGURES 2 and 3, are preferably hung from pins 60 positioned at one end of each gas velocity increaser 58, which pins 60 seat directly atop a weir tube 36. Each gas velocity increaser 58, as shown in FIG. 3 consists of a substantially smooth surfaced rod free of any surface interruptions and they are composed of suitable corrosive resistant material, such as, impervious graphite. The gas velocity increaser 58 can be joined to or assembled with other gas velocity increasers for different tube lengths by employing suitable connectors or couplings 64. It has been found that the use of one or two of these couplings per absorber tube does not unduly affect the desired gas flow pattern. A plurality of small and thin spacers 66 suitably disposed at 90 degree angles to each other serve to maintain the gas velocity increasers concentrically in the tubes 38. If desired, these spacers 66 can be used to join the coupling 64 to the ends of the gas velocity increasers 58. The preferred diameter of the gas velocity increasers 58 should be from about 45% to about 75% of the inside diameter of the tubes 38. FIG. 4 illustrates a modified form of the invention wherein the spacers 66 jut out from the gas velocity increasers 58 at an angle. The gas velocity increaser 58 is also shown in tubular form with suitable plugs on opposite ends. A hollow tubular velocity increaser is lighter in weight and is sometimes less expensive than a corresponding solid rod increaser.

Since the spacers 66 just touch the inner wall surface of the tubes 38 at points which are an extremely small percentage of the total available area, the liquid flowing down the inside wall is substantially undisturbed. The spacers 66 can be provided with conical or rounded tips to further achieve an undisturbed flow condition.

In the operation of a falling-film type cooler-absorber employed in the absorption of gases, such as hydrogen chloride gas, the HCl is absorbed from a carrier gas while in co-current contact with a liquid film flowing down a cooled, inside tube wall. Since heat is given off on absorption, the tubes are cooled by water flowing around suitable baffles within the shell of the unit which surrounds the tube bundle. Because all the gas cannot be absorbed in the cooler-absorber, a countercurrent tail gas scrubber (not shown) integrated with the apparatus may be provided so that complete absorption is approached and vent loss is reduced to a negligible value.

The basic relationships rescribing the absorption of HCl may be expressed as follows:

$$N_A = \frac{.0122DG}{PM^{1.75}\mu} P_{am} A$$

wherein $N_A$=moles HCl absorbed/hr.; $D$=inside tube diameter in feet; $G$=mass velocity, lbs. of gas/hr.-ft.² cross-sectional tube area; $P$=operating pressure, mm. Hg absolute; $M$=mean molecular wt. of gas; $\mu$=gas viscosity, lbs./ft. hr.; $A$=absorber area for mass transfer based on inside tube diameter; and $P_{am}$=arithmetic mean pressure difference.

It can therefore be seen that the absorption of HCl is directly proportional to the mass velocity ($G$), and the gas velocity increasers increase this velocity by reducing the cross-sectional area available for gas flow without affecting the tube area available for heat and mass transfer.

The gas velocity increasers significantly improve the performance of falling-film cooler-absorbers. For example, HCl recovery was increased from about 67% to about 92% in the production of 20° Baumé hydrochloric acid when velocity increasers of the invention were installed in an existing HCl gas absorption system. However, the gas velocity increasers should not create unnecessary turbulence of the liquid film nor cause liquid entrainment. Liquid entrainment precludes further increases in mass velocity and the basic function of the gas velocity increasers is to increase the gas velocity with minimum turbulence.

A single high performance falling-film cooler-absorber can replace two conventional units thus the overall capital for a typical installation is more economical. It should also be noted that by utilizing standard "increaser" length sections, more flexibility is maintained in the assembly of increasers for different tube lengths. By employing "increasers" of specific lengths and/or by suitably plugging some tubes of the cooler-absorber, it is possible to provide a product acid, for example, of a predetermined strength. Unabsorbed gas is usually passed through a suitable scrubber to eliminate vent losses.

The foregoing is considered as illustrative only of the principles of the invention. Further, since gas velocity increasers can be employed in any mass transfer process involving contact between a gas and a falling liquid film in which heat transfer or pressure drop considerations do not play a dominant role, and since numerous modifications and changes will readily occur to those skilled in the art, it is not desired to limit the invention to the exact structure shown and described, and accordingly all suitable modifications may be resorted to, falling within the scope of the invention as claimed.

What is claimed is:

1. In a falling-film type gas absorber comprising a heat exchanger having a tube bundle, a distribution section having a tube sheet, and a plurality of upstanding vertical weir tubes in said tube sheet, the improvement which comprises a plurality of smooth surfaced gas velocity increasers, means for suspendably disposing said increasers from the tops of said weir tubes, means for spacing said velocity increasers from the inside surface of said tubes of said tube bundle so as to form an annulus of constant diameter between the inside surface of each tube and said gas velocity increaser and means whereby the length of said velocity increasers is varied.

2. In a falling-film type absorber comprising a heat exchanger having a tube bundle, a distribution section having a tube sheet, and a plurality of upstanding vertical weir tubes in said tube sheet, the improvement which comprises a plurality of smooth surfaced, impervious graphite gas velocity increasers suspendably disposed from the tops of said weir tubes by a pin secured to the uppermost portion of said gas velocity increasers and means for spacing said gas velocity increasers from the inside surface of said tubes of said tube bundle so as to form an annulus of constant diameters between the inside surface of each tube and said gas velocity increasers whereby the rate of absorption of said gas is increased.

3. The improvement of claim 2 wherein said gas velocity increasers are spaced from the inside surface of said tubes by means of a plurality of spacer pins secured to and jutting out from the longitudinal surface of said gas velocity increasers.

4. The improvement of claim 3 wherein said spacer pins radially jut out from said longitudinal surface of said gas velocity increasers.

References Cited by the Examiner

UNITED STATES PATENTS

| 898,935 | 9/1908 | Sladek et al. | 261—153 |
| 2,797,554 | 7/1957 | Donovan | 165—158 X |
| 3,140,163 | 7/1964 | Hausberg | 261—116 X |

FOREIGN PATENTS

| 571,292 | 8/1945 | Great Britain. |
| 851,672 | 10/1960 | Great Britain. |
| 95,586 | 2/1960 | Norway. |

HARRY B. THORNTON, *Primary Examiner.*

RONALD R. WEAVER, *Examiner.*